(12) United States Patent
Powell et al.

(10) Patent No.: US 9,922,555 B2
(45) Date of Patent: Mar. 20, 2018

(54) DSRC TRAFFIC LIGHT

(71) Applicant: DENSO International America, Inc., Southfield, MI (US)

(72) Inventors: Patrick Powell, Farmington Hills, MI (US); Bryan Wells, Oceanside, CA (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/191,637

(22) Filed: Jun. 24, 2016

(65) Prior Publication Data

US 2017/0372603 A1 Dec. 28, 2017

(51) Int. Cl.
| | |
|---|---|
| *G08G 1/00* | (2006.01) |
| *G08G 1/07* | (2006.01) |
| *G08G 1/017* | (2006.01) |
| *F21V 19/00* | (2006.01) |
| *H05B 37/02* | (2006.01) |
| *F21S 9/02* | (2006.01) |
| *F21Y 115/10* | (2016.01) |
| *F21W 131/103* | (2006.01) |

(52) U.S. Cl.
CPC ............ *G08G 1/07* (2013.01); *F21S 9/02* (2013.01); *F21V 19/006* (2013.01); *G08G 1/0175* (2013.01); *H05B 37/0272* (2013.01); *F21W 2131/103* (2013.01); *F21Y 2115/10* (2016.08)

(58) Field of Classification Search
CPC ......... E01F 9/608; G08G 1/095; G08G 1/096; G09F 15/005; G09F 15/0075; G09F 2013/0472; G09F 9/33
See application file for complete search history.

(56) References Cited

U.S. PATENT DOCUMENTS

| | | | |
|---|---|---|---|
| 9,565,625 B1* | 2/2017 | MacNeille | ............ H04W 48/18 |
| 9,615,066 B1* | 4/2017 | Tran | ................ H04N 7/183 |
| 2007/0008178 A1* | 1/2007 | Lo | ................... G08G 1/095 |
| | | | 340/907 |

* cited by examiner

*Primary Examiner* — Omeed Alizada
(74) *Attorney, Agent, or Firm* — Harness, Dickey & Pierce, P.L.C.

(57) ABSTRACT

A light bulb assembly equipped for dedicated short range communication (DSRC). The light bulb assembly includes a light emitting element and a DSRC transceiver. The light bulb assembly is configured for receipt by a traffic light.

14 Claims, 2 Drawing Sheets

DSRC TRAFFIC LIGHT

FIELD

The present disclosure relates to a traffic light having dedicated short range communication (DSRC) capabilities.

BACKGROUND

This section provides background information related to the present disclosure, which is not necessarily prior art.

Dedicated short range communication (DSRC) is a two-way, short to medium range, wireless communications system that permits high speed transmission between two or more vehicles and/or between vehicles and infrastructure. DSRC can be used in a variety of different ways, such as to facilitate safe, expedient, and orderly vehicle travel. For example, DSRC systems can be used to transmit real-time advisories to drivers alerting them of imminent hazards, such as vehicles stopped suddenly ahead, potential collisions, dangerous road conditions, emergency vehicles, accidents, and/or when the driver's vehicle is about to cross the centerline or near the edge of the road. DSRC systems can also be used for traffic enforcement, such as for monitoring intersections to identify vehicles that have run red lights, made prohibited turns, or violated any other traffic regulation.

DSRC systems often rely on DSRC transceivers mounted to roadway infrastructure, or infrastructure proximate to a roadway. As DSRC implementation increases, it will be necessary to install a large number of DSRC transceivers along roadways throughout the world. Ways to install DSRC transceivers that are cost efficient, quick, and not disruptive to existing infrastructure or the environment would therefore be desirable. The present teachings include DSRC transceivers that provide such advantages, as well as numerous others.

SUMMARY

This section provides a general summary of the disclosure, and is not a comprehensive disclosure of its full scope or all of its features.

The present teachings include a light bulb assembly configured for dedicated short-range communication (DSRC). The light bulb assembly includes a light emitting element and a DSRC transceiver. The light bulb assembly is configured for receipt by a traffic light.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 1:
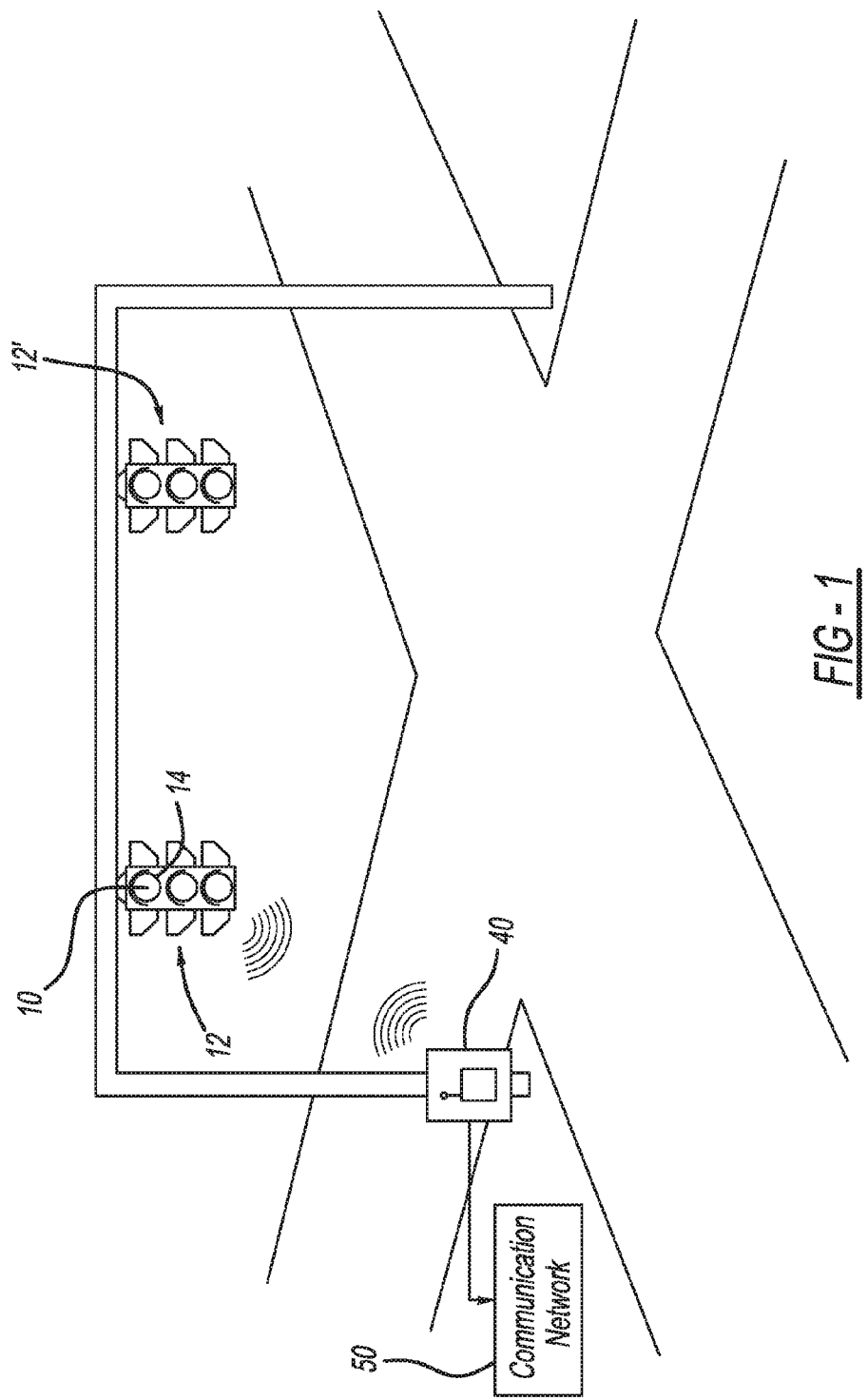
Figure 2:
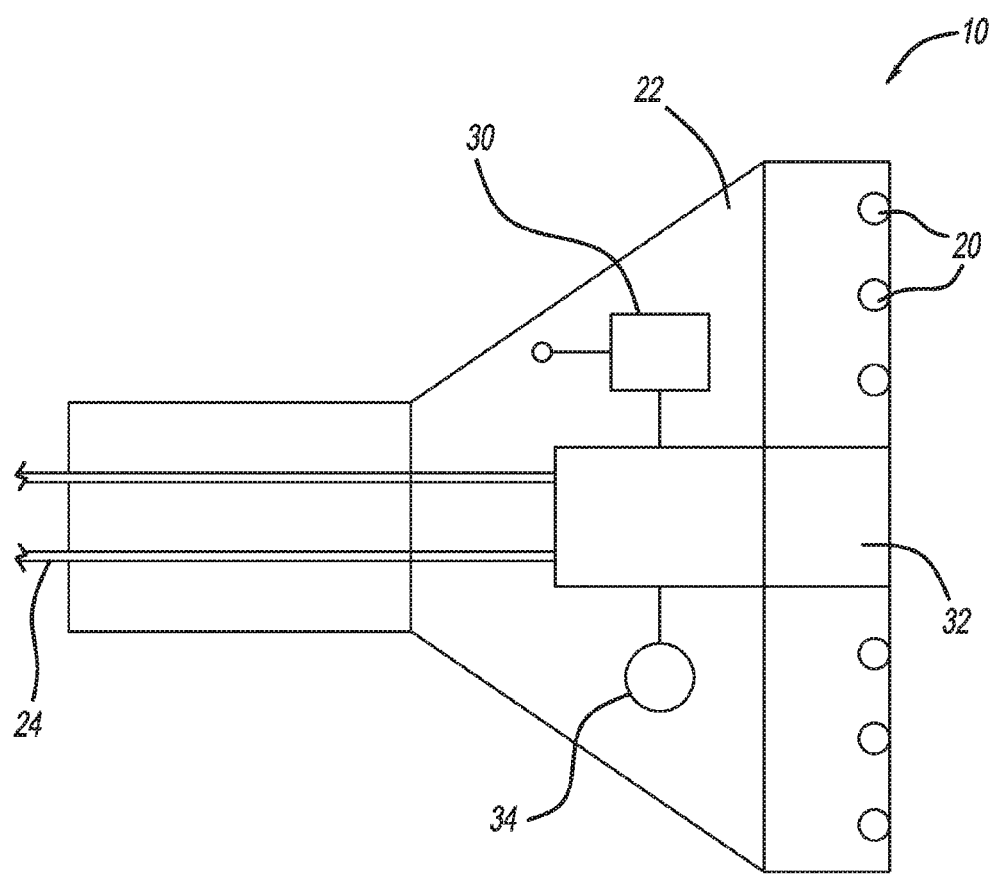

FIG. 1 illustrates a traffic light including a DSRC lightbulb assembly according to the present teachings, which is in communication with a receiver unit and ultimately a communications network; and FIG. 2 is a cross-sectional view of the DSRC lightbulb assembly according to the present teachings.

Corresponding reference numerals indicate corresponding parts throughout the several views of the drawings.

DETAILED DESCRIPTION

Example embodiments will now be described more fully with reference to the accompanying drawings.

With initial reference to FIG. 1, a dedicated short range communication (DSRC) lightbulb assembly according to the present teachings is illustrated at reference numeral 10. The DSRC lightbulb assembly 10 is connected to a traffic light 12, and specifically is one of the lightbulbs of the traffic light 12 seated in a lightbulb socket 14 thereof. Although the DSRC lightbulb assembly 10 is illustrated in FIG. 1 as the top lightbulb, and thus the red or stop lightbulb, the DSRC lightbulb assembly 10 can be configured as any lightbulb of any suitable traffic light. For example, the DSRC lightbulb assembly 10 can be a yellow yield lightbulb, a green go lightbulb, an arrow lightbulb, etc. FIG. 1 illustrates another traffic light at reference numeral 12', which may or may not include another DSRC lightbulb assembly 10. Although the traffic light 12 is illustrated as being suspended over an intersection by a support member, the traffic light 12 can be mounted in any other suitable manner at any other location.

As explained further herein, the DSRC lightbulb assembly 10 is configured to communicate with a receiver unit 40 in any suitable manner, such as with any suitable wired or wireless connection. The receiver unit 40 is configured as an interface with a communications network 50. The receiver unit 40 can be connected to the communications network 50 in any suitable manner, such as with any suitable wired or wireless connection. The communications network 50 is any suitable communications network configured to receive information from the receiving unit 40 (such as traffic conditions sensed by the DSRC lightbulb assembly 10), or transmit data to the receiver unit 40 for ultimate transmission by the DSRC lightbulb assembly 10 (such as information regarding traffic accidents, construction, traffic jams, police situations, etc.). The communications network can be the Internet, an Intranet, or any other suitable network.

With reference to FIG. 2, the DSRC lightbulb assembly 10 will now be described in further detail. The DSRC lightbulb assembly 10 includes one or more light emitting elements 20, which are arranged within a housing 22 of the assembly 10. The light emitting elements 20 can be any suitable light emitting elements configured to emit light sufficient for drivers to see. For example, the light emitting elements 20 can be a plurality of LED diodes configured to illuminate red, yellow, or green. The light emitting elements 20 can be powered in any suitable manner, including by an external current source, such as the power grid. Current is conducted to the assembly 10 in any suitable manner, such as by terminals 24, which are configured to mate with terminals of the socket 14.

The DSRC lightbulb assembly 10 further includes a DSRC transceiver 30. The DSRC transceiver 30 is any suitable radio frequency transmitter and/or receiver configured for DSRC radio frequency transmission and/or reception. For example, the DSRC transceiver 30 is configured to transmit and/or receive Wi-Fi signals, such as in the 5.9 GHz band.

The DSRC transceiver 30 is configured to receive signals from, and/or transmit signals to, any suitable DSRC transmitters and receivers. For example, the DSRC transceiver 30 is configured to transmit DSRC signals to DSRC receivers of DSRC equipped vehicles to inform operators of the vehicles of various road conditions, such as traffic conditions, physical road conditions, environmental conditions, presence of emergency vehicles, and/or locations of other vehicles, particularly other vehicles that may present a collision threat. The DSRC transceiver 30 is further configured to receive signals from DSRC transmitters of vehicles and/or infrastructure. The DSRC transceiver 30 is configured to receive any suitable DSRC signals, such as signals identifying the location of nearby vehicles in order to assess traffic conditions and potential collision situations, locations of emergency vehicles, road conditions, environmental conditions, etc.

The DSRC lightbulb assembly 10 can further include a camera 32. The camera 32 can be any suitable camera configured to capture any suitable images or data. For example, the camera 32 can be a visible light camera, an infrared (IR) camera, etc. When configured as a visible light camera, for example, the camera 32 can be configured to capture still images and/or video. Images and/or data captured by the camera 32 can be transmitted to the receiver unit 40, such as with a wireless or wired connection.

Data received by the DSRC transceiver 30, as well as images/data collected by the camera 32, can be transmitted to the receiver unit 40 using any suitable wired or wireless connection. From the receiver unit 40, the data received by the DSRC transceiver 30 and images/data collected by the camera 32, is distributed by the communications network 50 for use in any suitable manner. For example, images can be transferred to a traffic center for use in managing traffic flow, and/or to a police command center for use by law enforcement as necessary. Likewise, the data transmitted by the DSRC transceiver 30 can be provided to the DSRC transceiver 30 from the communications network 50 by way of the receiver unit 40.

The DSRC lightbulb assembly 10 further includes a battery 34 within the housing 22. The battery 34 can be any battery configured to power the DSRC transceiver 30 and the camera 32 when power to the assembly 10 for illuminating the light emitting elements 20 is cut (i.e., when a different light of the traffic light 12 is illuminated). When power is supplied to the assembly 10 by way of the terminals 24 for illuminating the light emitting element 20, the transceiver 30 and the camera 32 can be powered by the current conducted by the terminals 24, and the battery 34 may be charged as well.

The present teachings thus provide a cost efficient and easy to install community DSRC system. Specifically, by replacing existing traffic light lightbulbs with the DSRC lightbulb assembly 10 and installing the receiver units 40, a large area can be provided with one or more DSRC systems. In areas with a sufficient number of DSRC transceivers 30 in close proximity to one another, such as where DSRC lightbulb assemblies 10 are arranged at subsequent intersections, DSRC communications can be relayed amongst different DSRC transceivers 30 of different assemblies 10 to create a virtual cell network for DSRC communication, as well as for mobile telephones and other wireless devices, such as personal smartphones. Communication amongst DSRC transceivers 30 can also reduce the number of receiver units 40 needed because multiple DSRC transceivers 30 can communicate with the communication network 50 through a single receiver unit 40.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A light bulb assembly equipped for dedicated short range communication (DSRC), the light bulb assembly comprising:
    a light emitting element;
    a DSRC transceiver; and
    a battery configured to power the DSRC transceiver;
    wherein the light bulb assembly is configured for receipt by a traffic light; and
    wherein the battery is configured to power the DSRC transceiver and a camera of the light bulb assembly when the light emitting element is not illuminated.

2. The light bulb assembly of claim 1, further comprising a housing including both the light emitting element and the DSRC transceiver.

3. The light bulb assembly of claim 2, wherein the housing is configured to be received within a socket of the traffic light.

4. The light bulb assembly of claim 1, further comprising terminals configured to conduct electrical current from a current source to the light emitting element to illuminate the light emitting element and power the DSRC transceiver.

5. The light bulb assembly of claim 1, further comprising the camera configured to capture at least one of still images and video.

6. The light bulb assembly of claim 1, wherein the light emitting element includes a plurality of light emitting diodes.

7. The light bulb assembly of claim 1, wherein the DSRC transceiver is configured to communicate with a receiver unit that is remote to the light bulb assembly by at least one of a wireless connection and a wired connection.

8. The light bulb assembly of claim 7, wherein the receiver unit is connected to a communications network.

9. The light bulb assembly of claim 1, wherein each one of the following is included within a single housing configured to be received by a socket of the traffic light: the light emitting element, the DSRC transceiver, the camera, and a battery.

10. A dedicated short range communication (DSRC) system for a traffic light, the system comprising:
    a light bulb assembly configured to be received by a socket of the traffic light, the light bulb assembly including a light emitting element, a DSRC transceiver, and a camera;
    a receiver unit separate from the traffic light and in wireless communication with the DSRC transceiver;
    a communications network connected to the receiver unit; and
    wherein the light bulb assembly further includes a battery configured to power the DSRC transceiver and the camera when current for illuminating the light emitting element is not supplied to the light bulb assembly from an external current source.

11. The DSRC system of claim 10, further comprising a housing including each one of the light emitting element, the DSRC transceiver, and the camera.

12. The DSRC system of claim 10, wherein the DSRC transceiver is configured to transmit DSRC signals to, and receive DSRC signals from, vehicles equipped with DSRC.

13. The DSRC system of claim 10, wherein the DSRC transceiver is configured to receive DSRC signals from infrastructure having DSRC transmitters.

14. The DSRC system of claim 10, wherein the DSRC transceiver is configured to transmit DSRC signals to, and receive DSRC signals from, a secondary light bulb assembly including a secondary DSRC transceiver.

\* \* \* \* \*